US012640088B2

(12) United States Patent
Li et al.

(10) Patent No.: US 12,640,088 B2
(45) Date of Patent: May 26, 2026

(54) PIXEL CIRCUIT

(71) Applicant: AUO Corporation, Hsinchu City (TW)

(72) Inventors: Nien-Chen Li, Hsinchu City (TW); Shu-Hao Huang, Hsinchu City (TW); Sung-Yu Su, Hsinchu City (TW)

(73) Assignee: AUO Corporation, Hsinchu City (TW)

( * ) Notice: Subject to any disclaimer, the term of this patent is extended or adjusted under 35 U.S.C. 154(b) by 0 days.

(21) Appl. No.: 18/908,907

(22) Filed: Oct. 8, 2024

(65) Prior Publication Data

US 2025/0191525 A1 Jun. 12, 2025

(30) Foreign Application Priority Data

Dec. 6, 2023 (TW) ................................ 112147543
Feb. 27, 2024 (TW) ................................ 113107087

(51) Int. Cl.
*G09G 3/32* (2016.01)

(52) U.S. Cl.
CPC ........... *G09G 3/32* (2013.01); *G09G 2310/08* (2013.01); *G09G 2330/021* (2013.01)

(58) Field of Classification Search
CPC ................. G09G 3/32; G09G 2310/08; G09G 2330/021
See application file for complete search history.

(56) References Cited

U.S. PATENT DOCUMENTS

| | | | | |
|---|---|---|---|---|
| 11,335,248 | B1 * | 5/2022 | Huang | G09G 3/32 |
| 2014/0225878 | A1 | 8/2014 | Shih et al. | |
| 2018/0190185 | A1 * | 7/2018 | Ko | G09G 3/3233 |
| 2021/0012713 | A1 | 1/2021 | Dong | |
| 2024/0144884 | A1 * | 5/2024 | Lu | G09G 3/3225 |

FOREIGN PATENT DOCUMENTS

| | | | |
|---|---|---|---|
| TW | 202223858 | A | 6/2022 |
| TW | I848658 | B | 7/2024 |

* cited by examiner

*Primary Examiner* — Muhammad N Edun
(74) *Attorney, Agent, or Firm* — WPAT, PC

(57) ABSTRACT

A pixel circuit includes a driving transistor, a capacitor, a reset transistor and a writing transistor. One end of the capacitor receives an emission control signal, and the other end of the capacitor is coupled to a gate terminal of the driving transistor. The reset transistor is coupled between an initial voltage terminal and the gate terminal of the driving transistor. The writing transistor is coupled between a data line and the gate terminal of the driving transistor. When the driving transistor is turned on according to the emission control signal, the driving transistor generates a driving current to drive a light emitting element, and at the same time, both the reset transistor and the writing transistor are turned off. There are only the driving transistor and the light emitting element disposed in a current path that provides the driving current.

14 Claims, 12 Drawing Sheets

PIXEL CIRCUIT

CROSS-REFERENCE TO RELATED APPLICATION

This application claims priority to Taiwan Application Serial Number 112147543, filed Dec. 6, 2023, and Taiwan Application Serial Number 113107087, filed Feb. 27, 2024, the disclosures of which are incorporated herein by reference in their entireties.

BACKGROUND

Field of Invention

The present disclosure relates to a pixel circuit. More particularly, the present disclosure relates to a low power pixel circuit to reduce the power consumption of a display panel.

Description of Related Art

Regarding the current technology, light emitting diode (LED) display panels have the advantages of thinner thickness, higher resolution, higher color saturation and higher brightness, and thus the LED display panels meet the requirements of portable electronic devices. Therefore, the proportion of wearable devices or other electronic devices using the LED display panels has increased rapidly.

In order to meet energy saving requirements and provide a more advantageous user experience, the current mainstream goal is to develop low-power display panels. In the pixel circuit of the display panel, disposing more components in the current path that provides the driving current to the LED will cause the overall voltage across the current path to increase, thus resulting in greater power consumption. Therefore, how to reduce the number of components disposed in the current path of the driving current of the LED is an important issue in this field.

SUMMARY

The present disclosure provides a pixel circuit includes a driving transistor, a capacitor, a reset transistor and a writing transistor. One end of the capacitor receives an emission control signal, and the other end of the capacitor is electrically coupled to a gate terminal of the driving transistor. The reset transistor is electrically coupled between an initial voltage terminal and the gate terminal of the driving transistor. The writing transistor is electrically coupled between a data line and the gate terminal of the driving transistor. When the driving transistor is turned on according to the emission control signal, the driving transistor generates a driving current to drive a light emitting element, and at the same time, both the reset transistor and the writing transistor are turned off. There are only the driving transistor and the light emitting element disposed in a current path that provides the driving current.

In accordance with one or more embodiments of the present disclosure, an anode of the light emitting element is electrically coupled to a system high voltage terminal, and a cathode of the light emitting element is electrically coupled to a first terminal of the driving transistor. A second terminal of the driving transistor is electrically coupled to a system low voltage terminal. The driving current flows from the system high voltage terminal to the system low voltage terminal through the light emitting element and the driving transistor in sequence.

In accordance with one or more embodiments of the present disclosure, an anode of the light emitting element is electrically coupled to a second terminal of the driving transistor, and a cathode of the light emitting element is electrically coupled to a system low voltage terminal. A first terminal of the driving transistor is electrically coupled to a system high voltage terminal. The driving current flows from the system high voltage terminal to the system low voltage terminal through the driving transistor and the light emitting element in sequence.

In accordance with one or more embodiments of the present disclosure, a gate terminal of the reset transistor receives a reset control signal and a gate terminal of the writing transistor receives a writing control signal. During a reset period of the pixel circuit, the reset transistor is turned on according to the reset control signal, thereby transmitting voltage of the initial voltage terminal to the gate terminal of the driving transistor. During a writing period of the pixel circuit, the writing transistor is turned on according to the writing control signal, thereby transmitting voltage of the data line to the gate terminal of the driving transistor.

In accordance with one or more embodiments of the present disclosure, during an emission period of the pixel circuit, the emission control signal switches between a low logic level and a high logic level according to a duty cycle, so that the driving transistor switches between an on-state and an off-state according to the emission control signal, thereby switching the light emitting element between the on-state and the off-state accordingly.

In accordance with one or more embodiments of the present disclosure, the pixel circuit further includes a first transistor and a second transistor. A first terminal of the first transistor is electrically coupled to a first terminal of the driving transistor or a second terminal of the driving transistor, and a gate terminal of the first transistor receives the emission control signal. The second transistor is electrically coupled between the data line and a second terminal of the first transistor.

In accordance with one or more embodiments of the present disclosure, during a driving transistor detection period of the pixel circuit, the light emitting element is not electrically coupled to the driving transistor, and a test control signal is applied to a gate terminal of the second transistor and the first transistor is turned on according to the emission control signal, causing a detection current to flow from a system low voltage terminal or a system high voltage terminal to the data line through the driving transistor, the first transistor, and the second transistor.

In accordance with one or more embodiments of the present disclosure, during a light emitting element detection period of the pixel circuit, the driving transistor is turned off, and a test control signal is applied to a gate terminal of the second transistor and the first transistor is turned on according to the emission control signal, causing a detection current to flow from a system low voltage terminal or a system high voltage terminal to the data line through the light emitting element, the first transistor, and the second transistor.

In accordance with one or more embodiments of the present disclosure, the pixel circuit further includes a third transistor. A first terminal of the third transistor is electrically coupled to a first terminal of the driving transistor or a second terminal of the driving transistor, and a second terminal of the third transistor is electrically coupled to the gate terminal of the driving transistor. A gate terminal of the writing transistor receives a writing control signal.

In accordance with one or more embodiments of the present disclosure, during a driving transistor detection period of the pixel circuit, the light emitting element is not electrically coupled to the driving transistor, and a test control signal is applied to a gate terminal of the third transistor and the writing transistor is turned on according to the writing control signal, causing a detection current to flow from a system low voltage terminal or a system high voltage terminal to the data line through the driving transistor, the third transistor, and the writing transistor.

In accordance with one or more embodiments of the present disclosure, during a light emitting element detection period of the pixel circuit, the driving transistor is turned off, and a test control signal is applied to a gate terminal of the third transistor and the writing transistor is turned on according to the writing control signal, causing a detection current to flow from a system low voltage terminal or a system high voltage terminal to the data line through the light emitting element, the third transistor, and the writing transistor.

The present disclosure further provides a pixel circuit includes a light emitting element, a driving transistor, a capacitor, a reset transistor and a writing transistor. The light emitting element is electrically coupled to a system high voltage terminal. The driving transistor is electrically coupled between the light emitting element and a system low voltage terminal. One end of the capacitor receives an emission control signal, and the other end of the capacitor is electrically coupled to a gate terminal of the driving transistor. The reset transistor is electrically coupled between an initial voltage terminal and the gate terminal of the driving transistor. The writing transistor is electrically coupled between a data line and the gate terminal of the driving transistor. During an emission period of the pixel circuit, the driving transistor is turned on according to the emission control signal, thereby generating a driving current flowed from the system high voltage terminal to the system low voltage terminal only through the light emitting element and the driving transistor in sequence.

In accordance with one or more embodiments of the present disclosure, during the emission period of the pixel circuit, the emission control signal switches between a low logic level and a high logic level according to a duty cycle, so that the driving transistor switches between an on-state and an off-state according to the emission control signal, thereby switching the light emitting element between the on-state and the off-state accordingly.

The present disclosure yet provides a pixel circuit includes a light emitting element, a driving transistor, a capacitor, a reset transistor and a writing transistor. The light emitting element is electrically coupled to a system low voltage terminal. The driving transistor is electrically coupled between the light emitting element and a system high voltage terminal. One end of the capacitor receives an emission control signal, and the other end of the capacitor is electrically coupled to a gate terminal of the driving transistor. The reset transistor is electrically coupled between an initial voltage terminal and the gate terminal of the driving transistor. The writing transistor is electrically coupled between a data line and the gate terminal of the driving transistor. During an emission period of the pixel circuit, the driving transistor is turned on according to the emission control signal, thereby generating a driving current flowed from the system high voltage terminal to the system low voltage terminal only through the driving transistor and the light emitting element in sequence.

In accordance with one or more embodiments of the present disclosure, during the emission period of the pixel circuit, the emission control signal switches between a low logic level and a high logic level according to a duty cycle, so that the driving transistor switches between an on-state and an off-state according to the emission control signal, thereby switching the light emitting element between the on-state and the off-state accordingly.

To sum up, in the pixel circuit of the present disclosure, there are only the driving transistor and the light emitting element disposed in the current path of the driving current of the light emitting element, thereby reducing the overall voltage across the current path of the driving current of the light emitting element, and thus the power consumption of the display panel can be reduced.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Specific embodiments of the present disclosure are further described in detail below with reference to the accompanying drawings, however, the embodiments described are not intended to limit the present disclosure and it is not intended for the description of operation to limit the order of implementation. The terms "first", "second", and "third" used in the specification should be understood for identifying units or data described by the same terminology, but are not referred to a particular order or sequence.

Figure 1:
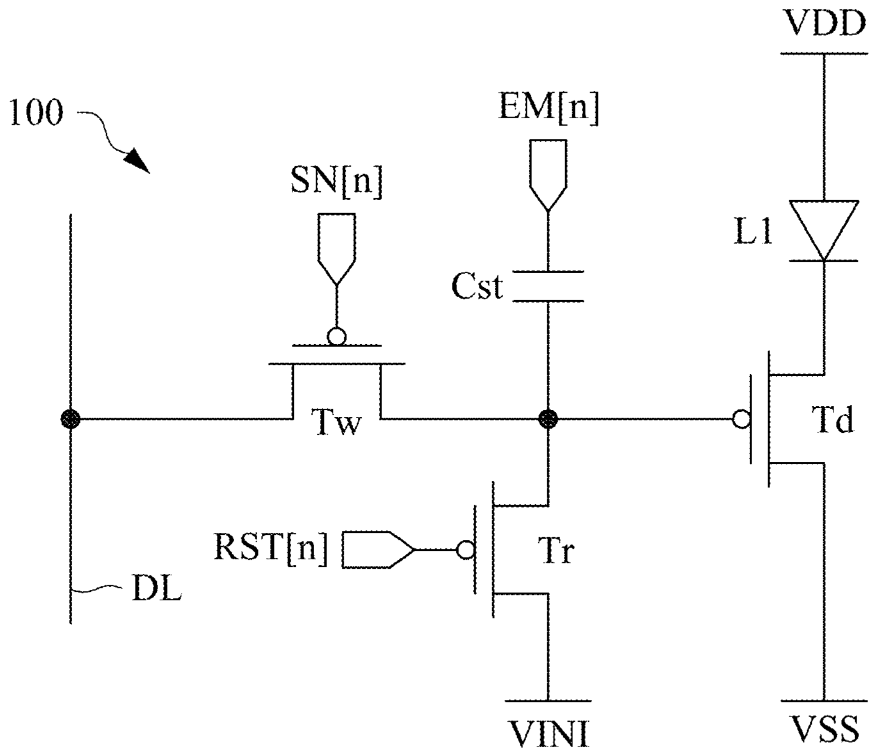
FIG. 1 is a circuit diagram of a pixel circuit according to some embodiments of the present disclosure.

FIG. 1 is a circuit diagram of a pixel circuit 100 according to some embodiments of the present disclosure. The pixel circuit 100 includes a driving transistor Td, a capacitor Cst, a reset transistor Tr, a writing transistor Tw, and a light emitting element L1.

In some embodiments, the light emitting element L1 is implemented by a micro light emitting diode (micro LED), a sub-millimeter light emitting diode (mini LED), a light emitting diode (LED), other light emitting diode with different size, or other component for emitting light.

Functionally, the driving transistor Td controls the amplitude of the driving current, and provides the driving current to the light emitting element L1 to cause the light emitting element L1 to emit light. Architecturally, the light emitting element L1 and the driving transistor Td are electrically connected in series in the current path of the driving current. During an emission period of the pixel circuit 100, the driving current flows from a system high voltage terminal VDD to a system low voltage terminal VSS through the light emitting element L1 and the driving transistor Td in sequence.

In a conventional pixel circuit, during the emission period, the driving current flows from the system high voltage terminal to the system low voltage terminal through the light emitting element and at least two transistors. In contrast, during the emission period of the pixel circuit 100, the driving current flows from the system high voltage terminal VDD to the system low voltage terminal VSS through the light emitting element and one transistor. Therefore, compared with the conventional pixel circuit, the pixel circuit 100 reduces the number of components disposed in the current path of the driving current of the light emitting element, thereby reducing the overall voltage across the current path of the driving current of the light emitting element, and thus the power consumption of the display panel can be reduced.

The aforementioned transistors respectively have a first terminal (i.e., a source terminal), a second terminal (i.e., a drain terminal) and a gate terminal. In addition, the aforementioned capacitor also has two opposite ends.

As shown in FIG. 1, an anode of the light emitting element L1 is electrically coupled to the system high voltage terminal VDD, and a cathode of the light emitting element L1 is electrically coupled to the first terminal (i.e., the source terminal) of the driving transistor Td. In other words, the light emitting element L1 is disposed between the system high voltage terminal VDD and the first terminal (i.e., the source terminal) of the driving transistor Td.

As shown in FIG. 1, the first terminal (i.e., the source terminal) of the driving transistor Td is electrically coupled to the cathode of the light emitting element L1, and the second terminal (i.e., the drain terminal) of the driving transistor Td is electrically coupled to the system low voltage terminal VSS, and the gate terminal of the driving transistor Td is electrically coupled to the capacitor Cst, the second terminal (i.e., the drain terminal) of the reset transistor Tr, and the second terminal (i.e., the drain terminal) of the writing transistor Tw.

As shown in FIG. 1, one end of the capacitor Cst receives the emission control signal EM[n], and the other end of the capacitor Cst is electrically coupled to the gate terminal of the driving transistor Td.

As shown in FIG. 1, the first terminal (i.e., the source terminal) of the reset transistor Tr is electrically coupled to ab initial voltage terminal VINI, and the second terminal (i.e., the drain terminal) of the reset transistor Tr is electrically coupled to the gate terminal of the driving transistor Td, and the gate terminal of the reset transistor Tr receives the reset control signal RST[n].

As shown in FIG. 1, the first terminal (i.e., the source terminal) of the writing transistor Tw is electrically coupled to a data line DL, and the second terminal (i.e., the drain terminal) of the writing transistor Tw is electrically coupled to the gate terminal of driving transistor Td, and the gate terminal of the writing transistor Tw receives the writing control signal SN[n].

Figure 2:
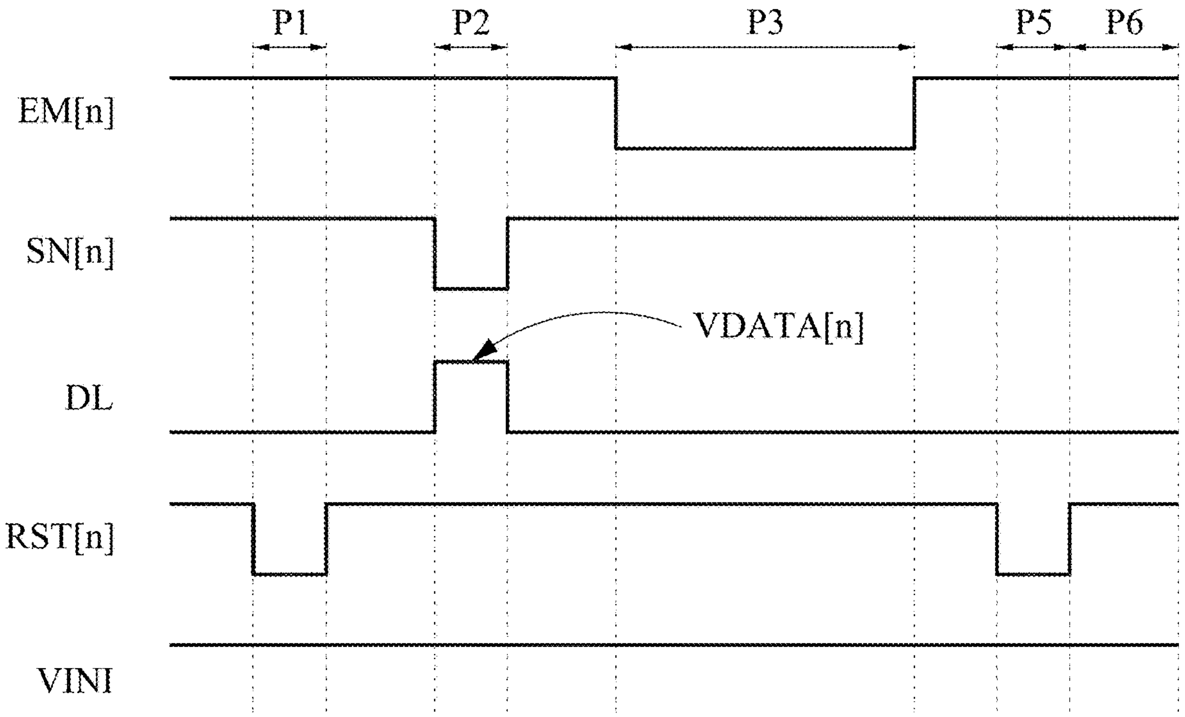
FIG. 2 is a timing chart of signals of the pixel circuit according to some embodiments of the present disclosure.
Figure 3A:
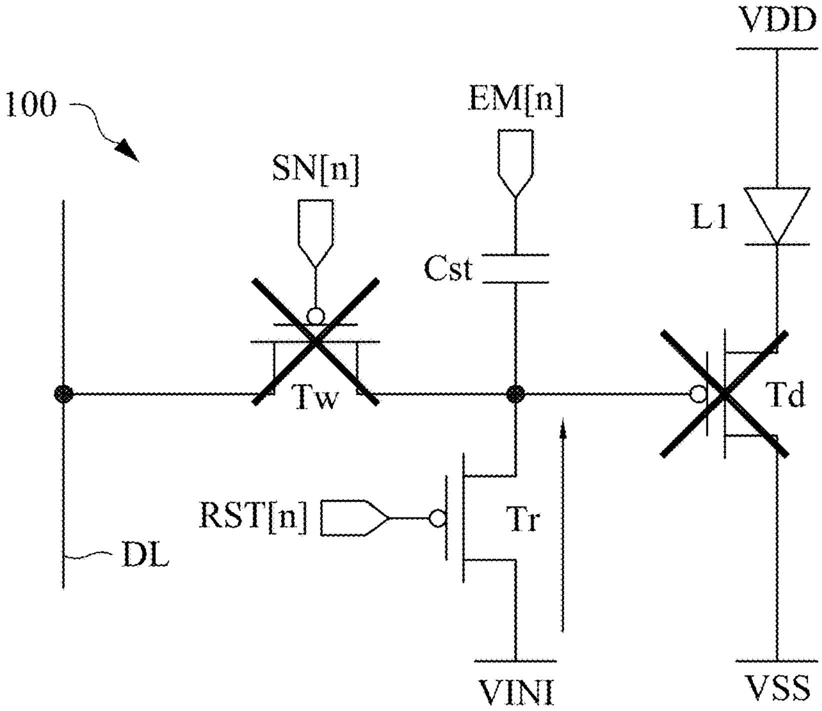
FIG. 3A is a schematic diagram of states of transistors of the pixel circuit during reset periods according to some embodiments of the present disclosure.
Figure 3B:
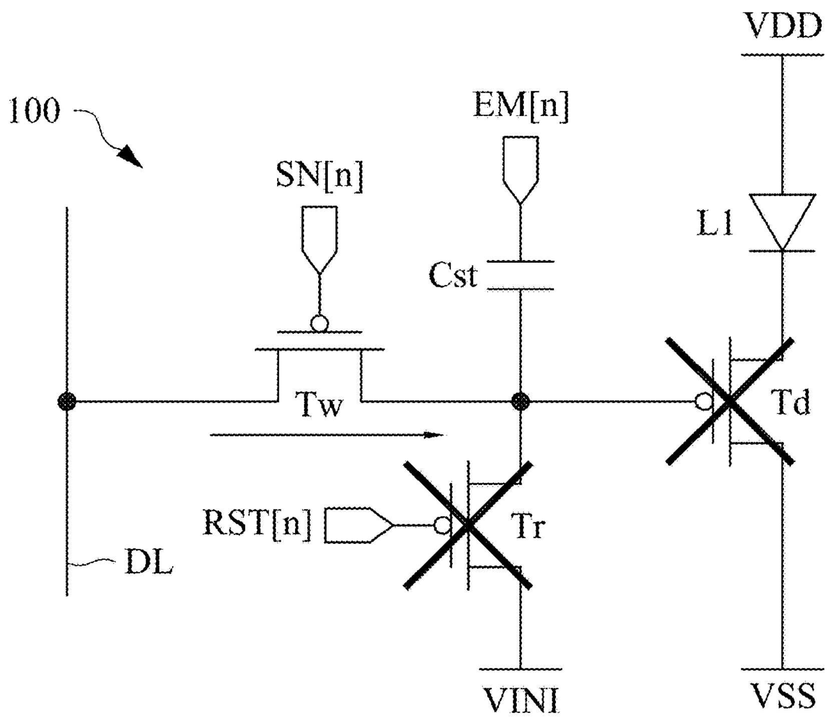
FIG. 3B is a schematic diagram of states of transistors of the pixel circuit during a writing period according to some embodiments of the present disclosure.
Figure 3C:
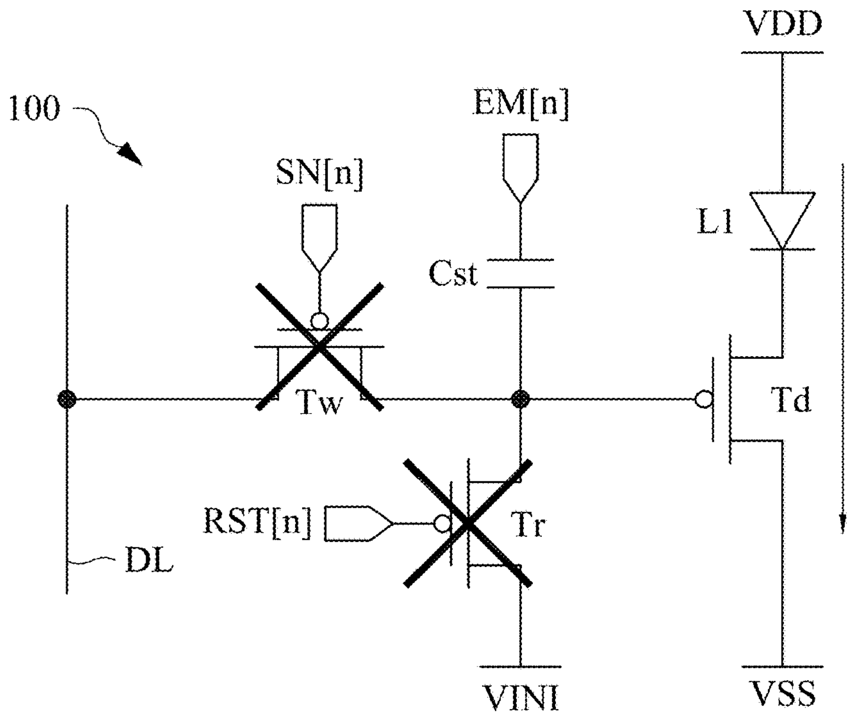
FIG. 3C is a schematic diagram of states of transistors of the pixel circuit during an emission period according to some embodiments of the present disclosure.
Figure 3D:
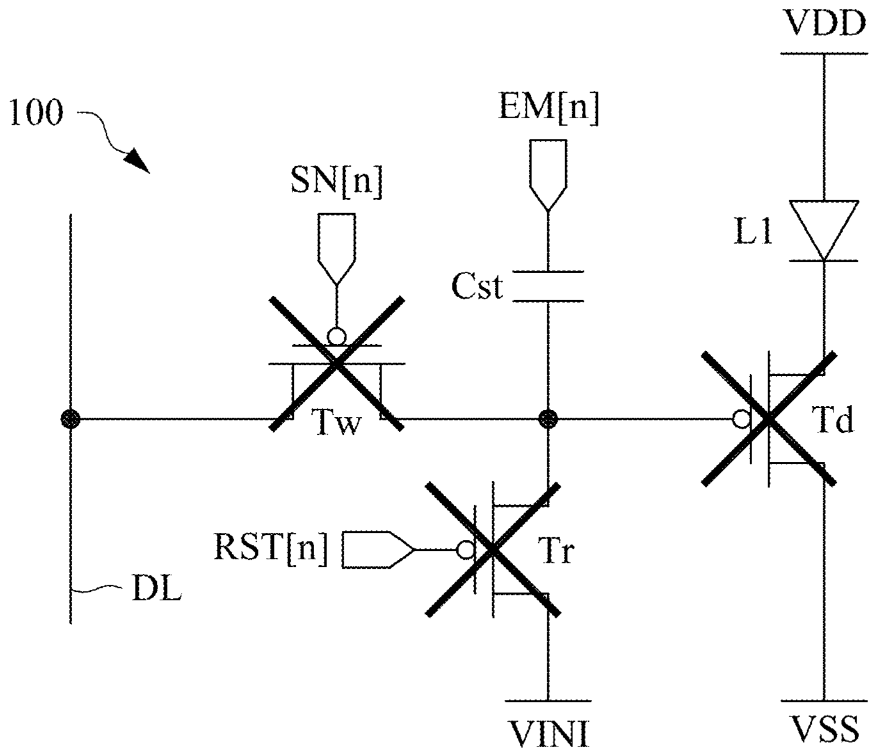
FIG. 3D is a schematic diagram of states of transistors of the pixel circuit during a holding period according to some embodiments of the present disclosure.

In order to make the overall operation of the pixel circuit 100 clearer and easier to be understood, please refer to FIG. 2, FIG. 3A, FIG. 3B, FIG. 3C, and FIG. 3D. FIG. 2 is a timing chart of signals of the pixel circuit 100 according to some embodiments of the present disclosure. FIG. 3A is a schematic diagram of states of transistors of the pixel circuit 100 during reset periods P1 and P5 according to some embodiments of the present disclosure. FIG. 3B is a schematic diagram of states of transistors of the pixel circuit 100 during a writing period P2 according to some embodiments of the present disclosure. FIG. 3C is a schematic diagram of states of transistors of the pixel circuit 100 during an emission period P3 according to some embodiments of the present disclosure. FIG. 3D is a schematic diagram of states of transistors of the pixel circuit 100 during a holding period P6 according to some embodiments of the present disclosure. As shown in FIG. 2, one display cycle in the control timing of the pixel circuit 100 can be mainly divided into five periods, which are respectively the reset period P1, the writing period P2, the emission period P3, the reset period P5, and the holding period P6. It should be noted that the time lengths of the aforementioned periods as shown in FIG. 2 are only examples, and the present disclosure is not limited thereto.

As shown in FIG. 2 and FIG. 3A, during the reset period P1, the reset control signal RST[n] is at a low logic level, and thus the reset transistor Tr is turned on. On the other hand, each of the emission control signal EM[n] and the writing control signal SN[n] is at a high logic level, and thus the writing transistor Tw is turned off.

In detail, during the reset period P1, a voltage level of the initial voltage terminal VINI is transmitted to the gate terminal of the driving transistor Td through the turned-on reset transistor Tr, so as to reset a voltage level of the gate terminal of the driving transistor Td. Moreover, since the voltage level of the initial voltage terminal VINI is the high logic level, the voltage level of the gate terminal of the driving transistor Td is also the high logic level, and thus the driving transistor Td is turned off. In other words, during the reset period P1 of the pixel circuit 100, the reset transistor Tr is turned on according to the reset control signal RST[n], so as to transmit the voltage level of the initial voltage terminal VINI to the gate terminal of the driving transistor Td.

As shown in FIG. 2 and FIG. 3B, during the writing period P2, the writing control signal SN[n] is at the low logic level, and thus the writing transistor Tw is turned on. On the other hand, each of the reset control signal RST[n] and the emission control signal EM[n] is at the high logic level, at thus the reset transistor Tr is turned off. Furthermore, the data line DL has data voltage VDATA[n]. It should be noted that, for clarity of explanation, the data line DL only depicts one data voltage VDATA[n] in FIG. 2. However, in practical applications, the data line DL has plural data voltages transmitted to pixel columns in time sequence. Therefore, the present disclosure is not limited to the data line DL as shown in FIG. 2.

In detail, during the writing period P2, the data voltage VDATA[n] of the data line DL is transmitted to the gate terminal of the driving transistor Td through the writing transistor Tw, thereby performing the operation of data writing. Moreover, since a voltage level of the data voltage VDATA[n] is the high logic level, the voltage level of the gate terminal of the driving transistor Td is also the high logic level, and thus the driving transistor Td is turned off. In other words, during the writing period P2 of the pixel circuit 100, the writing transistor Tw is turned on according to the writing control signal SN[n], so as to transmit the data voltage VDATA[n] of the data line DL to the gate terminal of the driving transistor Td.

As shown in FIG. 2 and FIG. 3C, during the emission period P3, each of the reset control signal RST[n] and the writing control signal SN[n] is at the high logic level, and thus the writing transistor Tw and the reset transistor Tr are turned off. On the other hand, the emission control signal EM[n] switches from the high logic level to the low logic level, and the voltage drop of the emission control signal EM[n] (i.e., from the high logic level to the low logic level) is coupled to the gate terminal of the driving transistor Td through the capacitor Cst, which means that the voltage level of the gate terminal of the driving transistor Td correspondingly changes from VDATA[n] to (VDATA[n]−Vdrop*(Cst/Ctotal)), in which Vdrop is the voltage drop from the high logic level to the low logic level regarding the emission control signal EM[n], in which Ctotal is the overall total capacitance of the pixel circuit 100.

In detail, during the emission period P3, the voltage level of the gate terminal of the driving transistor Td is (VDATA[n]−Vdrop*(Cst/Ctotal)), and thus the driving transistor Td is turned on to cause the light emitting element L1 to emit light. Specifically, the driving current of the light emitting element L1 flows from the system high voltage terminal VDD to the system low voltage terminal VSS through the light emitting element L1 and the driving transistor Td. In other words, when the driving transistor Td is turned on according to the emission control signal EM[n], the driving transistor Td generates the driving current to drive the light emitting element L1 to cause the light emitting element L1 to emit light, and at the same time, the reset transistor Tr and the writing transistor Tw are turned off.

Accordingly, regarding the pixel circuit 100, there are only the driving transistor Td and the light emitting element L1 disposed in the current path of the driving current of the light emitting element L1. Therefore, compared with the conventional pixel circuit, the pixel circuit 100 reduces the number of components disposed in the current path of the driving current, thereby reducing the overall voltage across the current path of the driving current of the light emitting element, and thus the power consumption of the display panel can be reduced.

In addition, the pixel circuit 100 only has three transistors (i.e., the driving transistor Td, the reset transistor Tr, and the writing transistor Tw) and one capacitor (i.e., the capacitor Cst), which means that the pixel circuit 100 is a 3T1C circuit. The pixel circuit 100 has a smaller number of components, such that the pixel circuit 100 is advantageous for application in high-resolution panels or transparent displays.

As shown in FIG. 2 and FIG. 3A, during the reset period P5, the reset control signal RST[n] is at the low logic level, and thus the reset transistor Tr is turned on. On the other hand, each of the emission control signal EM[n] and the writing control signal SN[n] is at the high logic level, and thus the writing transistor Tw is turned off. In detail, during the reset period P5, the voltage level of the initial voltage terminal VINI is transmitted to the gate terminal of the driving transistor Td through the turned-on reset transistor Tr, so as to reset the voltage level of the gate terminal of the driving transistor Td. Moreover, since the voltage level of the initial voltage terminal VINI is the high logic level, the voltage level of the gate terminal of the driving transistor Td is also the high logic level, and thus the driving transistor Td is turned off. In other words, during the reset period P5 of the pixel circuit 100, the reset transistor Tr is turned on according to the reset control signal RST[n], so as to transmit the voltage level of the initial voltage terminal VINI to the gate terminal of the driving transistor Td.

As shown in FIG. 2 and FIG. 3D, during the holding period P6, the reset control signal RST[n] switches from the low logic level to the high logic level, and thus the reset transistor Tr is turned off, thereby causing the driving transistor Td, the reset transistor Tr, and the writing transistor Tw to be turned off, so that the voltage level of the gate terminal of the driving transistor Td is held/maintained at the voltage level of the initial voltage terminal VINI. Accordingly, the voltage level of the gate terminal of the driving transistor Td is not affected by various factors, such as leakage due to the writing transistor Tw and/or the reset transistor Tr are in on-state, or resistance-capacitance delay (RC delay).

Figure 4:
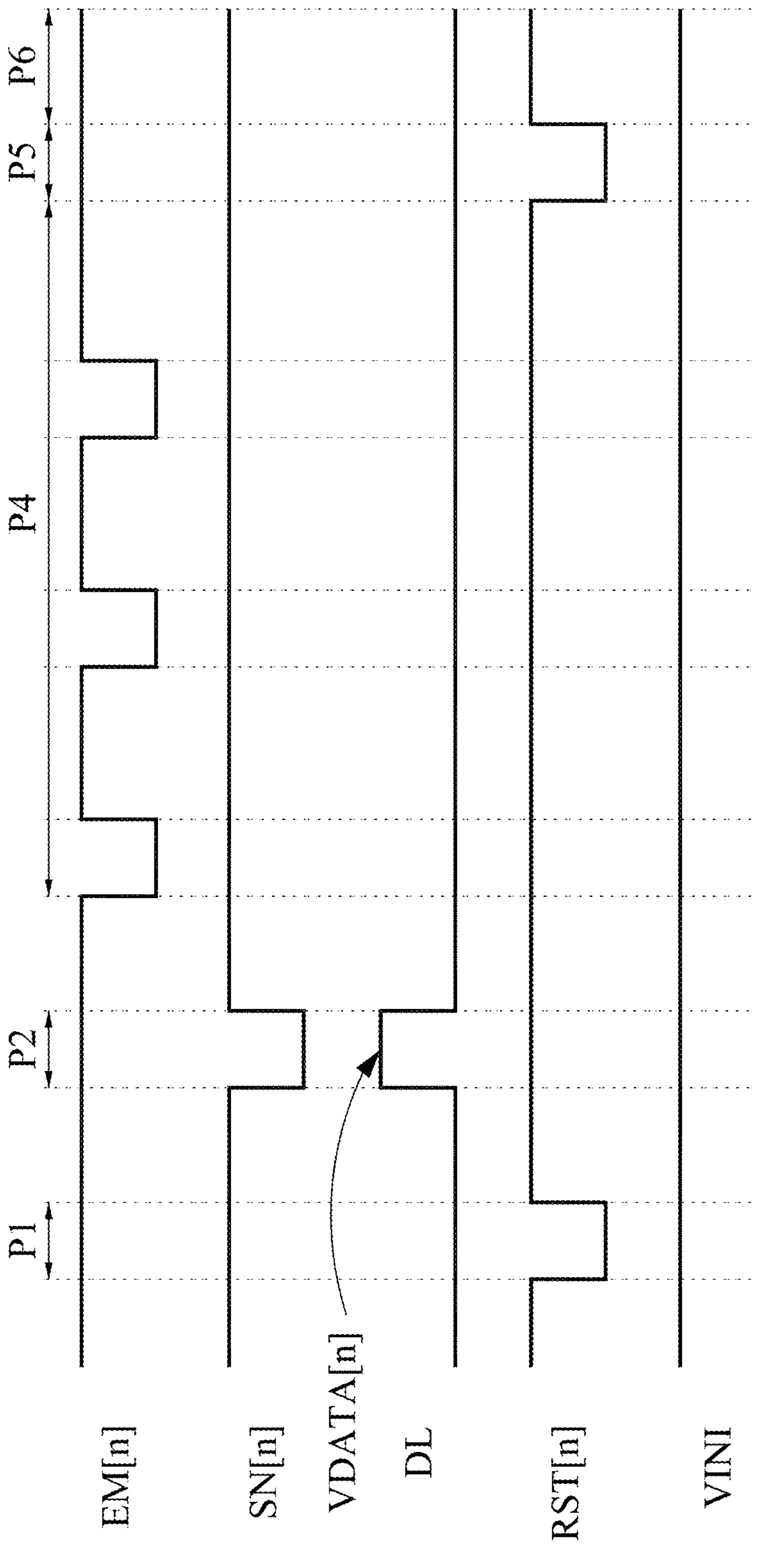
FIG. 4 is a timing chart of signals of the pixel circuit according to further embodiments of the present disclosure.

FIG. 4 is a timing chart of signals of the pixel circuit 100 according to further embodiments of the present disclosure. FIG. 4 is similar to FIG. 2, but the emission period P4 in the control timing of the pixel circuit 100 in FIG. 4 is different from the emission period P3 in the control timing of the pixel circuit 100 in FIG. 1. Specifically, during the emission period P4 of FIG. 4, the emission control signal EM[n] is a multi-pulse signal, that is, the emission control signal EM[n] is a signal that switches between the low logic level and the high logic level according to a duty cycle.

During the emission period P4 and when the emission control signal EM[n] is at the low logic level, each of the reset control signal RST[n] and the writing control signal SN[n] is at the high logic level, and thus the writing transistor Tw and the reset transistor Tr are turned off. On the other hand, the emission control signal EM[n] is at the low logic level, that is, (VDATA[n]−Vdrop*(Cst/Ctotal)), and thus the driving transistor Td is turned on to cause the light emitting element L1 to emit light. Specifically, the driving current of the light emitting element L1 flows from the system high voltage terminal VDD to the system low voltage terminal VSS through the light emitting element L1 and the driving transistor Td. In other words, when the driving transistor Td is turned on according to the emission control signal EM[n], the driving transistor Td generates the driving current to drive the light emitting element L1 to cause the light emitting element L1 to emit light, and at the same time, the reset transistor Tr and the writing transistors Tw are turned off.

During the emission period P4 and when the emission control signal EM[n] is at the high logic level, each of the reset control signal RST[n] and the writing control signal SN[n] is at the high logic level, and thus the writing transistor Tw and the reset transistor Tr are turned off. The emission control signal EM[n] switches from the low logic level to the high logic level, and the voltage rise of the emission control signal EM[n] (i.e., from the low logic level to the high logic level) is coupled to the gate terminal of the driving transistor Td through the capacitor Cst. That is, the voltage level of the gate terminal of the driving transistor Td changes from (VDATA[n]−Vdrop*(Cst/Ctotal)) to VDATA [n]. In detail, during the emission period P4 and when the emission control signal EM[n] is at the high logic level, since the voltage level of the data voltage VDATA[n] is at the high logic level, the voltage level of the gate terminal of the driving transistor Td is also at the high logic level, and thus the driving transistor Td is turned off to cause the light emitting element L1 to not emit light.

Specifically, regarding FIG. 4, the emission control signal EM[n] during the emission period P4 in the control timing of the pixel circuit 100 is a multi-pulse signal, thereby achieving an effect of multi-pulse emission (also called multi-pulse time-sharing emission). Furthermore, in conventional display panels, the effect of multi-pulse emission is usually achieved through a gate-driver-on-array (GOA) circuit. However, regarding the present disclosure, the effect of multi-pulse emission can be achieved by controlling the voltage level and timing of the emission control signal EM[n]. In other words, during the emission period P4 of FIG. 4, the emission control signal EM[n] switches between the low logic level and the high logic level according to a duty cycle (as shown in FIG. 4), and thus the driving transistor Td switches between the on-state and the off-state according to the emission control signal EM[n], such that the light emitting element L1 switches between the on-state and the off-state accordingly.

In addition, the time period between the reset period P1 and the writing period P2 in FIG. 2 and FIG. 4 is called a holding period (similar to the above-mentioned holding period P6). During this holding period, the reset control signal RST[n] switches from the low logic level to the high logic level, and thus the reset transistor Tr is turned off, thereby causing the driving transistor Td, the reset transistor Tr, and the writing transistor Tw to be turned off, so that the voltage level of the gate terminal of the driving transistor Td is held/maintained at the voltage level of the initial voltage terminal VINI. Accordingly, the voltage level of the gate terminal of the driving transistor Td is not affected by various factors, such as leakage due to the writing transistor Tw and/or the reset transistor Tr are in the on-state, or resistance-capacitance delay (RC delay).

Figure 5A:
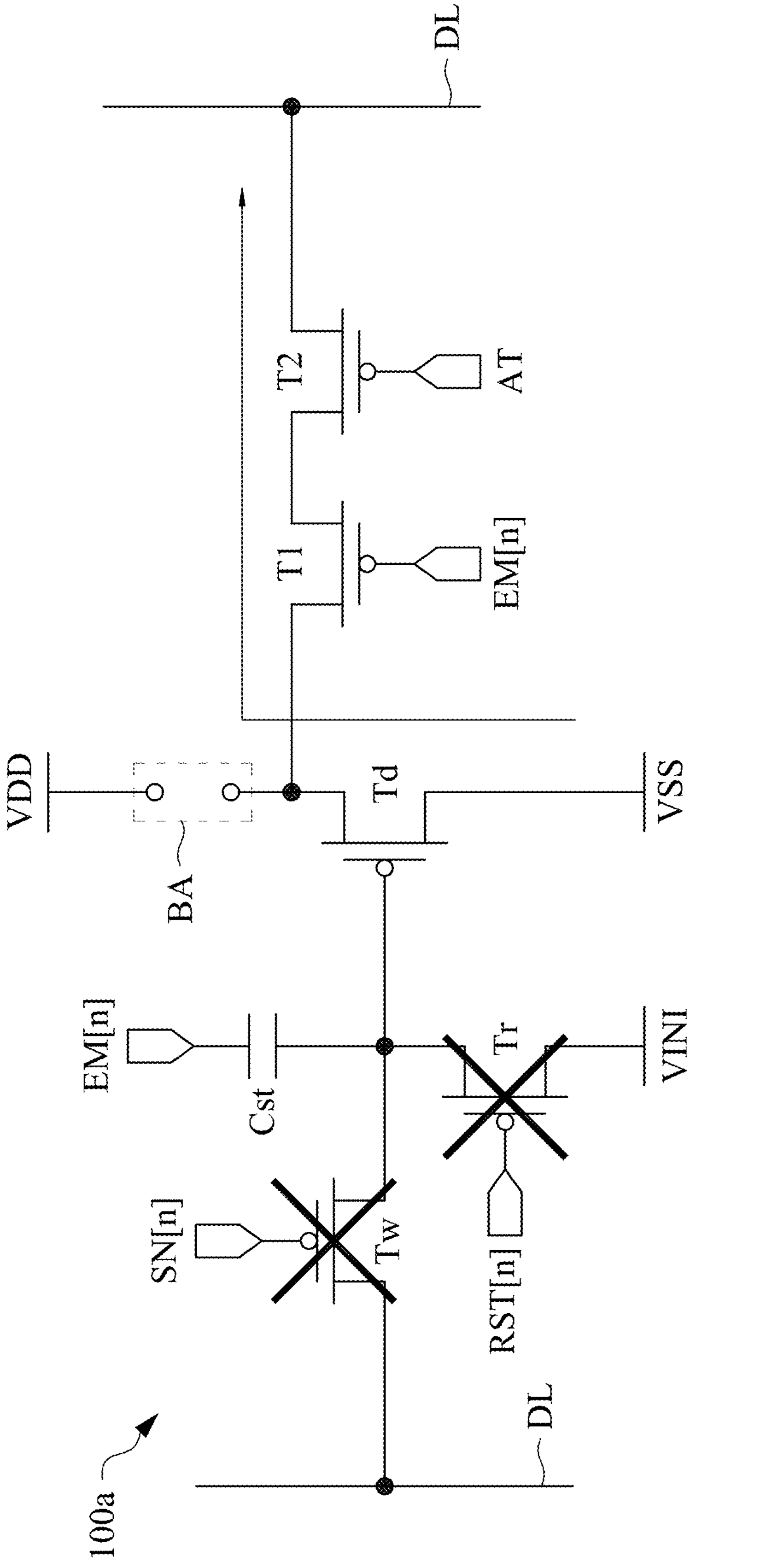
FIG. 5A is a circuit diagram of a pixel circuit during a driving transistor detection period according to some embodiments of the present disclosure.

FIG. 5A is a circuit diagram of a pixel circuit 100*a* during a driving transistor detection period according to some embodiments of the present disclosure. As shown in FIG. 5A, the pixel circuit 100*a* is based on the pixel circuit 100 of FIG. 1 and further adds a first transistor T1 and a second transistor T2.

In detail, the first terminal (i.e., the source terminal) of the first transistor T1 is electrically coupled to the first terminal (i.e., the source terminal) of the driving transistor Td, and the second terminal (i.e., the drain terminal) of the first transistor T1 is electrically coupled to the first terminal (i.e., the source terminal) of the second transistor T2, and the gate terminal of the first transistor T1 receives the emission control signal EM[n]. The second terminal (i.e., the drain terminal) of the second transistor T2 is electrically coupled to the data line DL, and the gate terminal of the second transistor T2 receives a test control signal AT.

It should be noted that the embodiment of FIG. 5A corresponds to the driving transistor detection period for detecting the driving transistor Td before the light emitting element L1 is disposed in an installation area BA. As shown in FIG. 5A, during the driving transistor detection period and when the reset transistor Tr and the write transistor Tw are turned off, the test control signal AT with the low logic level is provided to the gate terminal of the second transistor T2 to turn on the second transistor T2, and the test voltage is provided to the system low voltage terminal VSS. At this time, the first transistor T1 is turned on according to the emission control signal EM[n], so that the test voltage is transmitted from the system low voltage terminal VSS to the data line DL through the driving transistor Td, the first transistor T1, and the second transistor T2. In this way, a detection current (also called a detection signal herein) corresponding to the test voltage can be read through a readout circuit (not shown) electrically coupled to the data line DL, and thus the value of the detection current can be utilized to determine whether the driving transistor is defective.

It is worth mentioning that the test control signal AT is implemented by a global control signal, and the emission control signal EM[n] is a column-by-column scanning signal, so that the detection signals of the driving transistors in plural pixel columns are sequentially transmitted to the data line DL. In this way, based on the detection signals transmitted along the data line DL, the area of the defective driving transistor(s) can be detected (i.e., the pixel addressing detection is achieved). Defective driving transistors may cause uneven display (i.e., mura). Therefore, eliminating the defective driving transistors during the driving transistor detection stage before installing the light emitting element L1 can significantly reduce manufacturing costs.

Figure 5B:
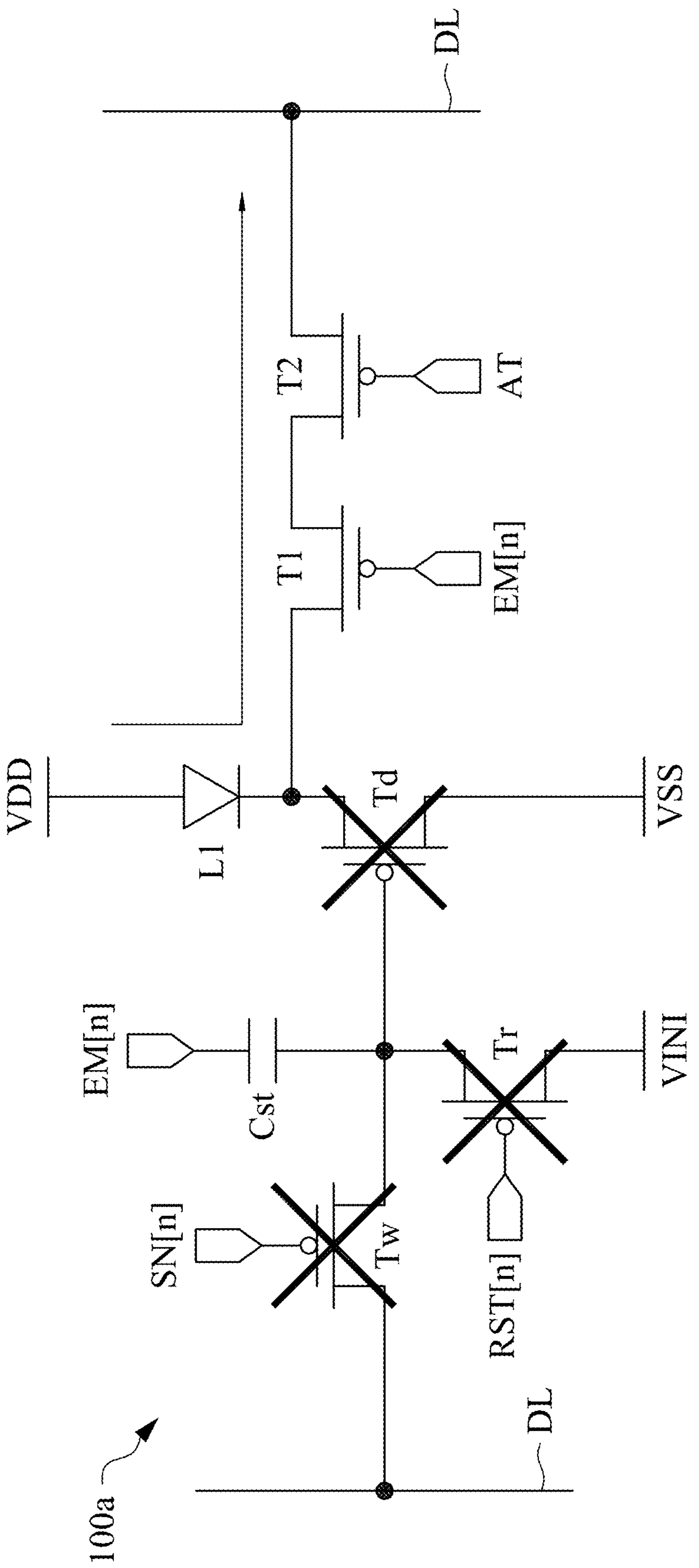
FIG. 5B is a circuit diagram of the pixel circuit during a light emitting element detection period according to some embodiments of the present disclosure.

FIG. 5B is a circuit diagram of the pixel circuit 100*a* during a light emitting element detection period according to some embodiments of the present disclosure. The architecture of the pixel circuit 100*a* of FIG. 5B corresponds to the architecture of the pixel circuit 100*a* of FIG. 5A. It should be noted that FIG. 5B is a schematic diagram of the light emitting element detection period after the light emitting element L1 is installed. As shown in FIG. 5B, during the light emitting element detection period, the reset transistor Tr, the writing transistor Tw, and the driving transistor Td are turned off. The manner to turn off the driving transistor Td can be realized by timing control. For example, during a first period, the reset transistor Tr is turned on according to the reset control signal RST[n], so as to write the high voltage level of the initial voltage terminal VINI into the gate terminal of the driving transistor Td. And then, during a second period after the first period, the reset transistor Tr and the write transistor Tw are turned off according to the reset control signal RST[n] and the writing control signal SN[n], at the same time, since the high voltage level of the gate terminal of the driving transistor Td is higher than the voltage level (i.e., VDD) of the drain terminal of the driving transistor Td, the driving transistor Td is turned off. At this time, the test control signal AT is provided to the gate terminal of the second transistor T2 to turn on the second transistor T2, and a test voltage is provided to the system high voltage terminal VDD. At this time, the first transistor T1 is turned on according to the emission control signal EM[n], so that the test voltage is transmitted from the system high voltage terminal VDD to the data line DL through the light emitting element L1, the first transistor T1, and the second transistor T2. In this way, the detection current (also called a detection signal herein) corresponding to the test voltage can be read through the readout circuit (not shown) electrically coupled to the data line DL, and thus the value of the detection current can be utilized to determine whether the light emitting element is defective.

Similarly, the test control signal AT is implemented by a global control signal, and the emission control signal EM[n] is a column-by-column scanning signal, so that the detection signals of the light emitting elements in plural pixel columns are sequentially transmitted to the data line DL (i.e. the pixel addressing detection is achieved). In this way, based on the detection signals transmitted along the data line DL, the area of the defective light emitting element(s) can be detected.

Figure 6A:
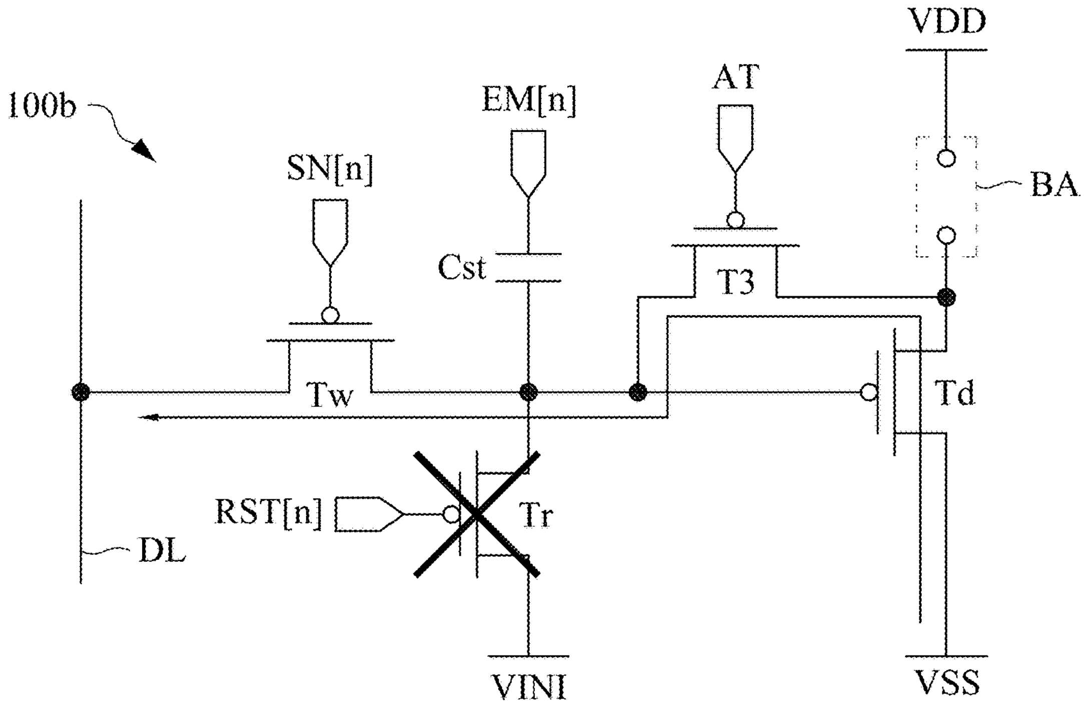
FIG. 6A is a circuit diagram of a pixel circuit during a driving transistor detection period according to some embodiments of the present disclosure.

FIG. 6A is a circuit diagram of a pixel circuit 100*b* during a driving transistor detection period according to some embodiments of the present disclosure. As shown in FIG. 6A, the pixel circuit 100*b* is based on the pixel circuit 100 of FIG. 1 and further adds a third transistor T3.

In detail, the first terminal (i.e., the source terminal) of the third transistor T3 is electrically coupled to the first terminal (i.e., the source terminal) of the driving transistor Td, and the second terminal (i.e., the drain terminal) of the third transistor T3 is electrically coupled to the gate terminal of the driving transistor Td, and the gate terminal of the third transistor T3 receives the test control signal AT.

It should be noted that the embodiment of FIG. 6A corresponds to the driving transistor detection period for detecting the driving transistor Td before the light emitting element L1 is disposed in an installation area BA. As shown in FIG. 6A, during the driving transistor detection period and when the reset transistor Tr is turned off, the test control signal AT with the low logic level is provided to the gate terminal of the third transistor T3 to turn on the third transistor T3, and the test voltage is provided to the system low voltage terminal VSS. At this time, the writing transistor Tw is turned on according to the writing control signal SN[n], so that the test voltage is transmitted from the system low voltage terminal VSS to the data line DL through the driving transistor Td, the third transistor T3, and the writing transistor Tw. In this way, a detection current (also called a detection signal herein) corresponding to the test voltage can be read through a readout circuit (not shown) electrically coupled to the data line DL, and thus the value of the detection current can be utilized to determine whether the driving transistor is defective.

It is worth mentioning that the test control signal AT is implemented by a global control signal, and the writing control signal SN[n] can be controlled to be a column-by-column scanning signal, so that the detection signals of the driving transistors in plural pixel columns are sequentially transmitted to the data line DL. In this way, based on the detection signals transmitted along the data line DL, the area of the defective driving transistor(s) can be detected (i.e., the pixel addressing detection is achieved). Defective driving transistors may cause uneven display (i.e., mura). Therefore, eliminating the defective driving transistors during the driving transistor detection stage before installing the light emitting element L1 can significantly reduce manufacturing costs.

Figure 6B:
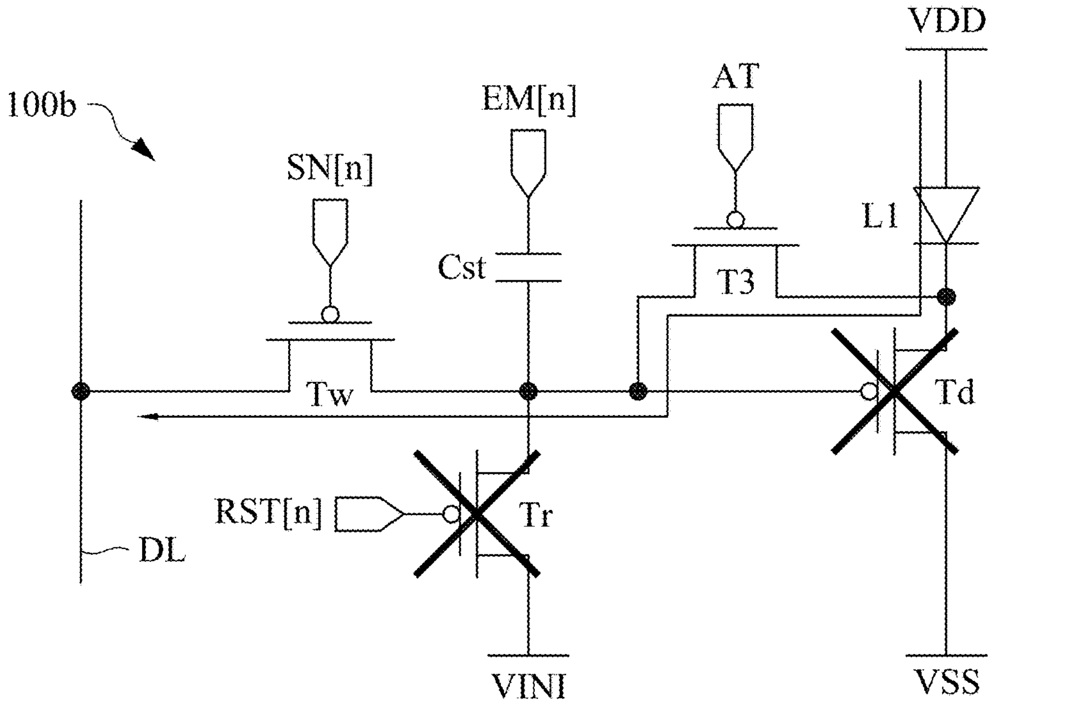
FIG. 6B is a circuit diagram of the pixel circuit during a light emitting element detection period according to some embodiments of the present disclosure.

FIG. 6B is a circuit diagram of the pixel circuit 100*b* during a light emitting element detection period according to some embodiments of the present disclosure. The architecture of the pixel circuit 100*b* of FIG. 6B corresponds to the architecture of the pixel circuit 100*b* of FIG. 6A. It should be noted that FIG. 6B is a schematic diagram of the light emitting element detection period after the light emitting element L1 is installed. As shown in FIG. 6B, during the light emitting element detection period, the reset transistor Tr and the driving transistor Td are turned off. The manner to turn off the driving transistor Td can be realized by timing control. For example, during a first period, the reset transistor Tr is turned on according to the reset control signal RST[n], so as to write the high voltage level of the initial voltage terminal VINI into the gate terminal of the driving transistor Td. And then, during a second period after the first period, the reset transistor Tr and the write transistor Tw are turned off according to the reset control signal RST[n] and the writing control signal SN[n], at the same time, since the high voltage level of the gate terminal of the driving transistor Td is higher than the voltage level (i.e., VDD) of the drain terminal of the driving transistor Td, the driving transistor Td is turned off. At this time, the test control signal AT is provided to the gate terminal of the third transistor T3 to turn on the third transistor T3, and a test voltage is provided to the system high voltage terminal VDD. At this time, the writing transistor Tw is turned on according to the writing control signal SN[n], so that the test voltage is transmitted from the system high voltage terminal VDD to the data line DL through the light emitting element L1, the third transistor T3, and the writing transistor Tw. In this way, the detection current (also called a detection signal herein) corresponding to the test voltage can be read through the readout circuit (not shown) electrically coupled to the data line DL, and thus the value of the detection current can be utilized to determine whether the light emitting element is defective.

Similarly, the test control signal AT is implemented by a global control signal, and the writing control signal SN[n] is controlled to be a column-by-column scanning signal, so that the detection signals of the light emitting elements in plural pixel columns are sequentially transmitted to the data line DL (i.e. the pixel addressing detection is achieved). In this way, based on the detection signals transmitted along the data line DL, the area of the defective light emitting element(s) can be detected.

Figure 7:
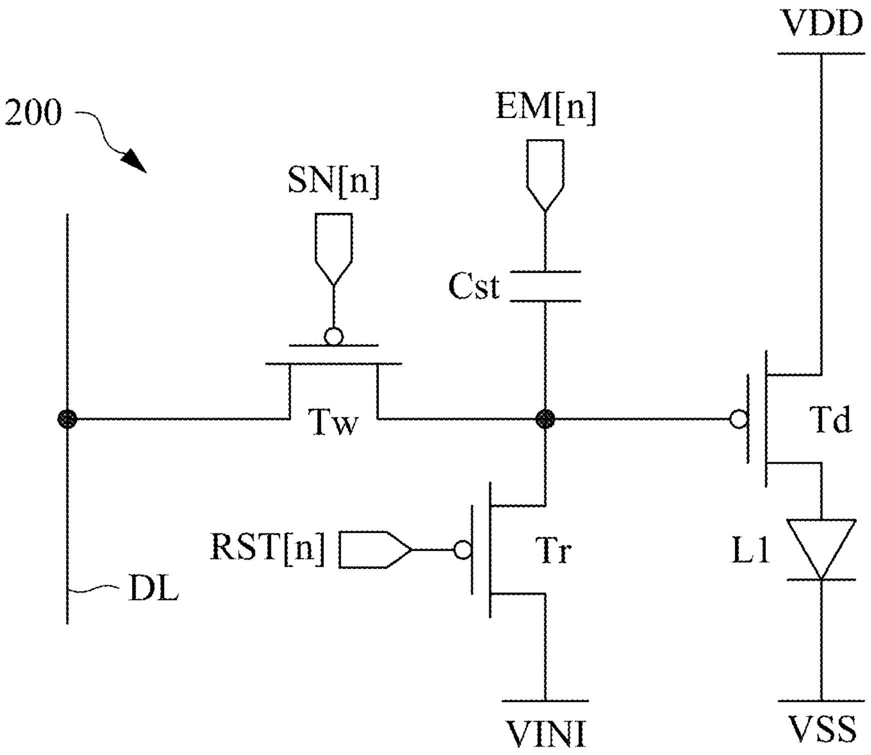
FIG. 7 is a circuit diagram of a pixel circuit according to other embodiments of the present disclosure.

FIG. 7 is a circuit diagram of a pixel circuit 200 according to other embodiments of the present disclosure. FIG. 7 is similar to FIG. 1, except that the light emitting element L1 of the pixel circuit 200 in FIG. 7 is disposed between the second terminal (i.e., the drain terminal) of the driving transistor Td and the system low voltage terminal VSS. In other words, the anode of the light emitting element L1 of the pixel circuit 200 is electrically coupled to the second terminal (i.e., the drain terminal) of the driving transistor Td, and the cathode of the light emitting element L1 of the pixel circuit 200 is electrically coupled to the system low voltage terminal VSS. The first terminal (i.e., the source terminal) of the driving transistor Td of the pixel circuit 200 is electrically coupled to the system high voltage terminal VDD. The driving current of the driving light emitting element L1 of the pixel circuit 200 flows from the system high voltage terminal VDD to the system low voltage terminal VSS through the driving transistor Td and the light emitting element L1. In addition, the control timing of the pixel circuit 200 of FIG. 7 is basically similar/identical to the control timing of the pixel circuit 100 of FIG. 1 (i.e., the operation mode of the reset period P1, the writing period P2, the emission period P3, the reset period P5, and the holding period P6 in FIG. 2 or the operation mode of the reset period P1, the writing period P2, the emission period P4, the reset period P5, and the holding period P6 in FIG. 4), and therefore will not be described again.

Figure 8A:
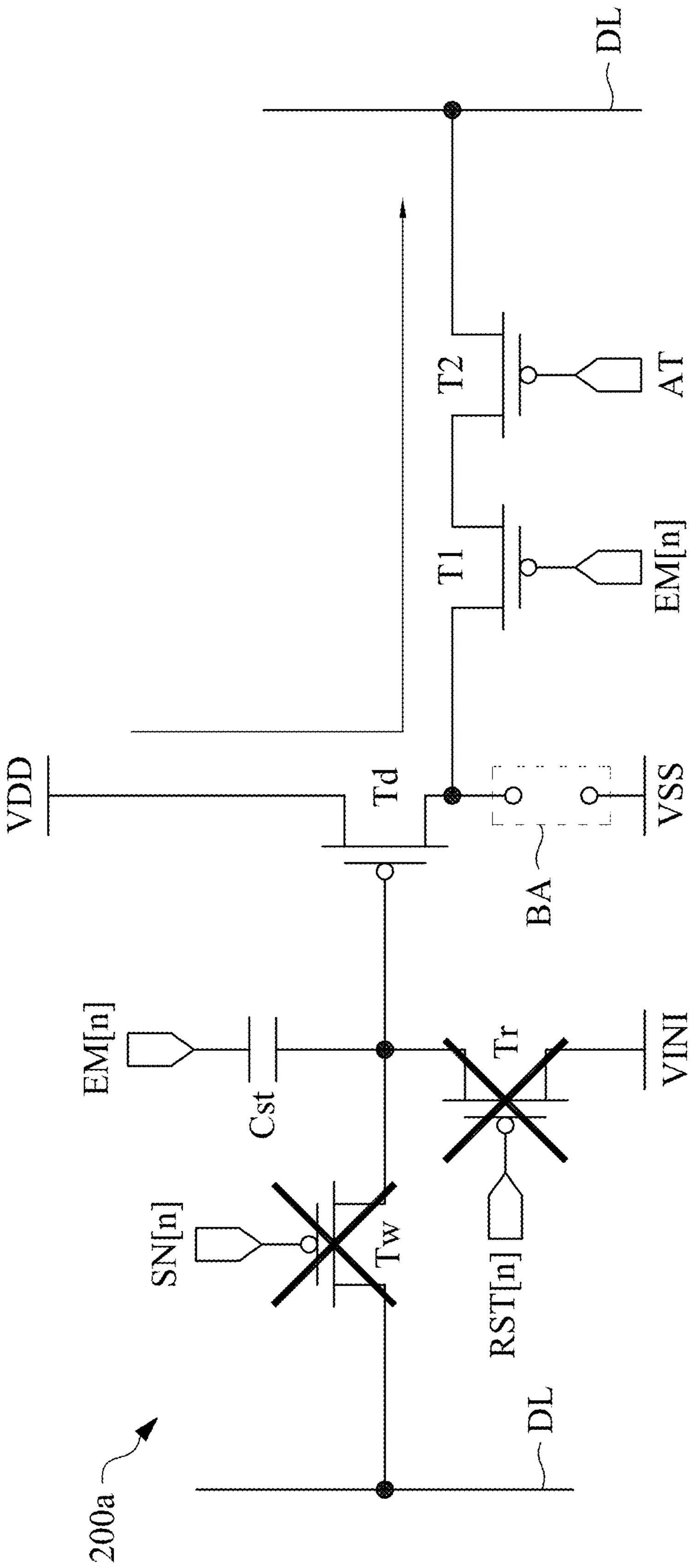
FIG. 8A is a circuit diagram of a pixel circuit during a driving transistor detection period according to some other embodiments of the present disclosure.

FIG. 8A is a circuit diagram of a pixel circuit 200*a* during a driving transistor detection period according to some other embodiments of the present disclosure. As shown in FIG. 8A, the pixel circuit 200*a* is based on the pixel circuit 200 of FIG. 7 and further adds a first transistor T1 and a second transistor T2. In detail, the first terminal (i.e., the source terminal) of the first transistor T1 is electrically coupled to the second terminal (i.e., the drain terminal) of the driving transistor Td, and the second terminal (i.e., the drain terminal) of the first transistor T1 is electrically coupled to the first terminal (i.e., the source terminal) of the second transistor T2, and the gate terminal of the first transistor T1 receives the emission control signal EM[n]. The second terminal (i.e., the drain terminal) of the second transistor T2 is electrically coupled to the data line DL, and the gate terminal of the second transistor T2 receives a test control signal AT.

It should be noted that the embodiment of FIG. 8A corresponds to the driving transistor detection period for detecting the driving transistor Td before the light emitting element L1 is disposed in an installation area BA. As shown in FIG. 8A, during the driving transistor detection period and when the reset transistor Tr and the write transistor Tw are turned off, the test control signal AT with the low logic level is provided to the gate terminal of the second transistor T2 to turn on the second transistor T2, and the test voltage is provided to the system low voltage terminal VSS. At this time, the first transistor T1 is turned on according to the emission control signal EM[n], so that the test voltage is transmitted from the system high voltage terminal VDD to the data line DL through the driving transistor Td, the first transistor T1, and the second transistor T2. In this way, a detection current (also called a detection signal herein) corresponding to the test voltage can be read through a readout circuit (not shown) electrically coupled to the data line DL, and thus the value of the detection current can be utilized to determine whether the driving transistor is defective.

Figure 8B:
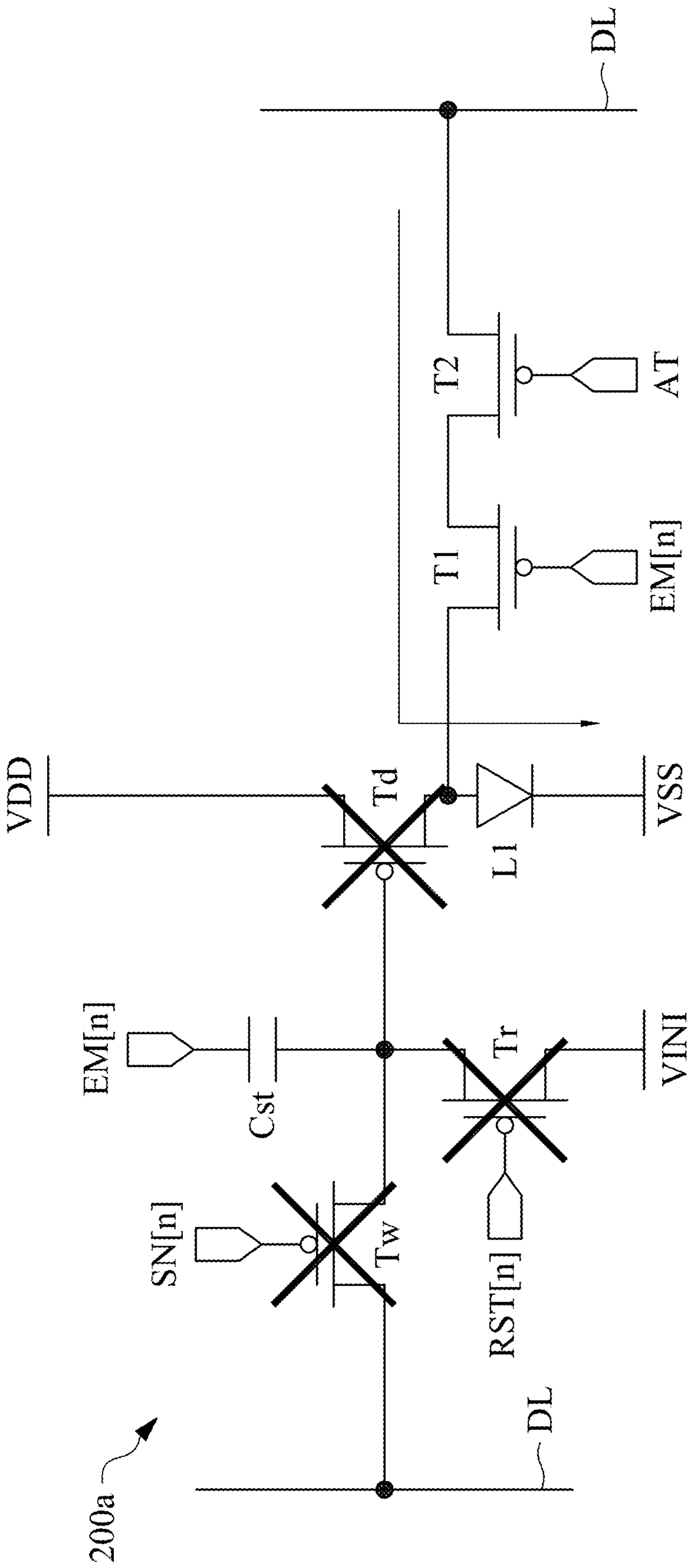
FIG. 8B is a circuit diagram of the pixel circuit during a light emitting element detection period according to some other embodiments of the present disclosure.

FIG. 8B is a circuit diagram of the pixel circuit 200*a* during a light emitting element detection period according to some other embodiments of the present disclosure. The architecture of the pixel circuit 200*a* of FIG. 8B corresponds to the architecture of the pixel circuit 200*a* of FIG. 8A. It should be noted that FIG. 8B is a schematic diagram of the light emitting element detection period after the light emitting element L1 is installed. As shown in FIG. 8B, during the light emitting element detection period, the reset transistor Tr, the writing transistor Tw, and the driving transistor Td are turned off. At this time, the test control signal AT is provided to the gate terminal of the second transistor T2 to turn on the second transistor T2, and a test voltage is provided to the system low voltage terminal VSS. At this time, the first transistor T1 is turned on according to the emission control signal EM[n], so that the test voltage is transmitted from the system low voltage terminal VSS to the data line DL through the light emitting element L1, the first transistor T1, and the second transistor T2. In this way, the detection current corresponding to the test voltage can be read through the readout circuit (not shown) electrically coupled to the data line DL, and thus the value of the detection current can be utilized to determine whether the light emitting element is defective.

Figure 9A:
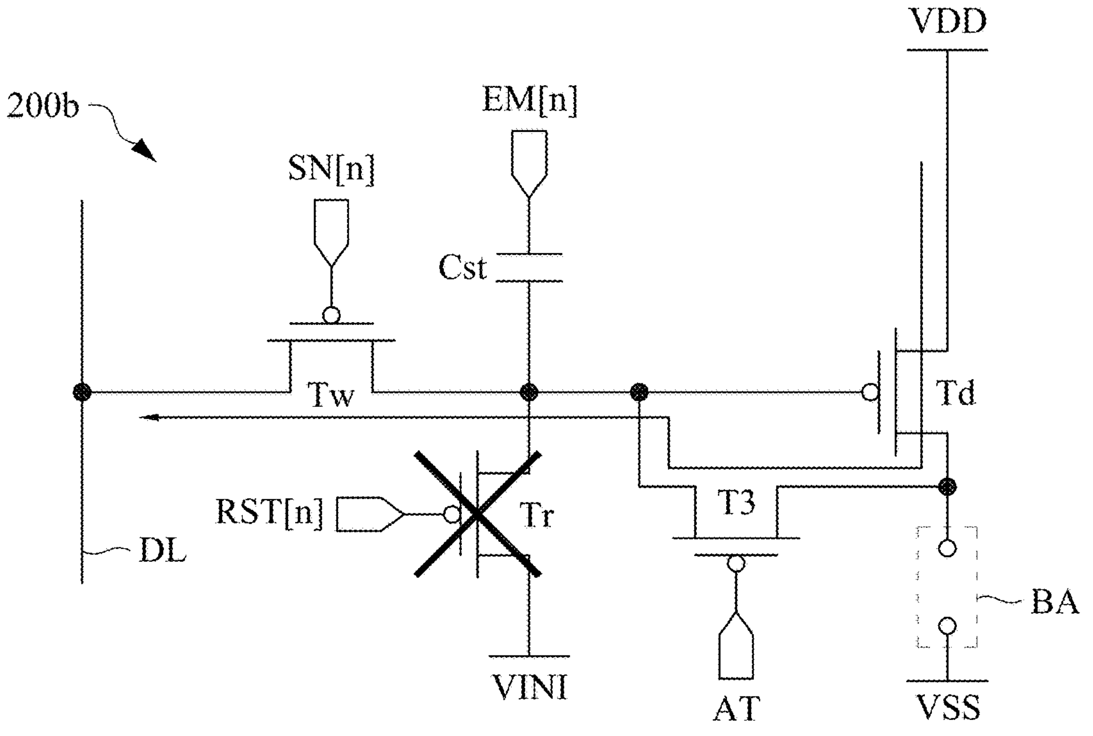
FIG. 9A is a circuit diagram of a pixel circuit during a driving transistor detection period according to some other embodiments of the present disclosure.

FIG. 9A is a circuit diagram of a pixel circuit 200*b* during a driving transistor detection period according to some other embodiments of the present disclosure. As shown in FIG. 9A, the pixel circuit 200*b* is based on the pixel circuit 200 of FIG. 7 and further adds a third transistor T3. In detail, the first terminal (i.e., the source terminal) of the third transistor T3 is electrically coupled to the second terminal (i.e., the drain terminal) of the driving transistor Td, and the second terminal (i.e., the drain terminal) of the third transistor T3 is electrically coupled to the gate terminal of the driving transistor Td, and the gate terminal of the third transistor T3 receives the test control signal AT.

It should be noted that the embodiment of FIG. 9A corresponds to the driving transistor detection period for detecting the driving transistor Td before the light emitting element L1 is disposed in an installation area BA. As shown in FIG. 9A, during the driving transistor detection period and when the reset transistor Tr is turned off, the test control signal AT with the low logic level is provided to the gate terminal of the third transistor T3 to turn on the third transistor T3, and the test voltage is provided to the system high voltage terminal VDD. At this time, the writing transistor Tw is turned on according to the writing control signal SN[n], so that the test voltage is transmitted from the system high voltage terminal VDD to the data line DL through the driving transistor Td, the third transistor T3, and the writing transistor Tw. In this way, a detection current corresponding to the test voltage can be read through a readout circuit (not shown) electrically coupled to the data line DL, and thus the value of the detection current can be utilized to determine whether the driving transistor is defective.

Figure 9B:
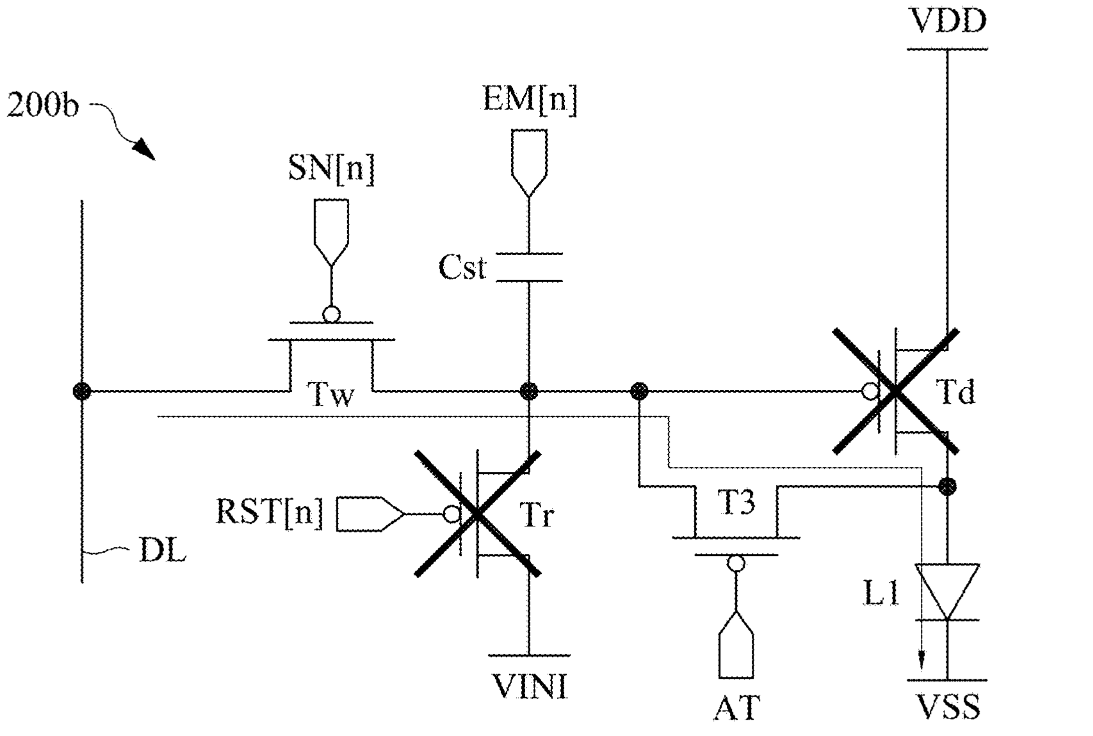
FIG. 9B is a circuit diagram of the pixel circuit during a light emitting element detection period according to some other embodiments of the present disclosure.

FIG. 9B is a circuit diagram of the pixel circuit 200*b* during a light emitting element detection period according to some other embodiments of the present disclosure. The architecture of the pixel circuit 200*b* of FIG. 9B corresponds to the architecture of the pixel circuit 200*b* of FIG. 9A. It should be noted that FIG. 9B is a schematic diagram of the light emitting element detection period after the light emitting element L1 is installed. As shown in FIG. 9B, during the light emitting element detection period, the reset transistor Tr and the driving transistor Td are turned off. At this time, the test control signal AT is provided to the gate terminal of the third transistor T3 to turn on the third transistor T3, and a test voltage is provided to the system low voltage terminal VSS. At this time, the writing transistor Tw is turned on according to the writing control signal SN[n], so that the test voltage is transmitted from the system low voltage terminal VSS to the data line DL through the light emitting element L1, the third transistor T3, and the writing transistor Tw. In this way, the detection current corresponding to the test voltage can be read through the readout circuit (not shown) electrically coupled to the data line DL, and thus the value of the detection current can be utilized to determine whether the light emitting element is defective.

To sum up, the present disclosure provides a pixel circuit, in which during the emission period, the driving current of the light emitting element flows from the system high voltage terminal to the system low voltage terminal through the light emitting element and one transistor. Therefore, compared with the conventional pixel circuit, the pixel circuit of the present disclosure reduces the number of components disposed in the current path of the driving current of the light emitting element, thereby reducing the overall voltage across the current path of the driving current of the light emitting element, and thus the power consumption of the display panel can be reduced.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims.

What is claimed is:

1. A pixel circuit, comprising:

a driving transistor;

a capacitor, wherein one end of the capacitor receives an emission control signal, and the other end of the capacitor is electrically coupled to a gate terminal of the driving transistor;

a reset transistor electrically coupled between an initial voltage terminal and the gate terminal of the driving transistor;

a writing transistor electrically coupled between a data line and the gate terminal of the driving transistor;

a first transistor, wherein a first terminal of the first transistor is electrically coupled to a first terminal of the driving transistor or a second terminal of the driving transistor, wherein a gate terminal of the first transistor receives the emission control signal; and a second transistor electrically coupled between the data line and a second terminal of the first transistor;

wherein when the driving transistor is turned on according to the emission control signal, the driving transistor generates a driving current to drive a light emitting element, and at the same time, both the reset transistor and the writing transistor are turned off; and wherein there are only the driving transistor and the light emitting element disposed in a current path that provides the driving current.

2. The pixel circuit of claim 1, wherein an anode of the light emitting element is electrically coupled to a system high voltage terminal, wherein a cathode of the light emitting element is electrically coupled to a first terminal of the driving transistor, wherein a second terminal of the driving transistor is electrically coupled to a system low voltage terminal, wherein the driving current flows from the system high voltage terminal to the system low voltage terminal through the light emitting element and the driving transistor in sequence.

3. The pixel circuit of claim 1, wherein an anode of the light emitting element is electrically coupled to a second terminal of the driving transistor, wherein a cathode of the light emitting element is electrically coupled to a system low voltage terminal, wherein a first terminal of the driving transistor is electrically coupled to a system high voltage terminal, wherein the driving current flows from the system high voltage terminal to the system low voltage terminal through the driving transistor and the light emitting element in sequence.

4. The pixel circuit of claim 1, wherein a gate terminal of the reset transistor receives a reset control signal and a gate terminal of the writing transistor receives a writing control signal;

wherein during a reset period of the pixel circuit, the reset transistor is turned on according to the reset control signal, thereby transmitting voltage of the initial voltage terminal to the gate terminal of the driving transistor; and wherein during a writing period of the pixel circuit, the writing transistor is turned on according to the writing control signal, thereby transmitting voltage of the data line to the gate terminal of the driving transistor.

5. The pixel circuit of claim 1, wherein during an emission period of the pixel circuit, the emission control signal switches between a low logic level and a high logic level according to a duty cycle, so that the driving transistor switches between an on-state and an off-state according to the emission control signal, thereby switching the light emitting element between the on-state and the off-state accordingly.

6. The pixel circuit of claim 1, wherein during a driving transistor detection period of the pixel circuit, the light emitting element is not electrically coupled to the driving transistor, and a test control signal is applied to a gate terminal of the second transistor and the first transistor is turned on according to the emission control signal, causing a detection current to flow from a system low voltage terminal or a system high voltage terminal to the data line through the driving transistor, the first transistor, and the second transistor.

7. The pixel circuit of claim 1, wherein during a light emitting element detection period of the pixel circuit, the driving transistor is turned off, and a test control signal is applied to a gate terminal of the second transistor and the first transistor is turned on according to the emission control signal, causing a detection current to flow from a system low voltage terminal or a system high voltage terminal to the data line through the light emitting element, the first transistor, and the second transistor.

8. The pixel circuit of claim 1, further comprising:

a third transistor, wherein a first terminal of the third transistor is electrically coupled to a first terminal of the driving transistor or a second terminal of the driving transistor, wherein a second terminal of the third transistor is electrically coupled to the gate terminal of the driving transistor, wherein a gate terminal of the writing transistor receives a writing control signal.

9. The pixel circuit of claim 8, wherein during a driving transistor detection period of the pixel circuit, the light emitting element is not electrically coupled to the driving transistor, and a test control signal is applied to a gate terminal of the third transistor and the writing transistor is turned on according to the writing control signal, causing a detection current to flow from a system low voltage terminal or a system high voltage terminal to the data line through the driving transistor, the third transistor, and the writing transistor.

10. The pixel circuit of claim 8, wherein during a light emitting element detection period of the pixel circuit, the driving transistor is turned off, and a test control signal is applied to a gate terminal of the third transistor and the writing transistor is turned on according to the writing control signal, causing a detection current to flow from a system low voltage terminal or a system high voltage terminal to the data line through the light emitting element, the third transistor, and the writing transistor.

11. A pixel circuit, comprising:

a light emitting element electrically coupled to a system high voltage terminal;

a driving transistor electrically coupled between the light emitting element and a system low voltage terminal;

a capacitor, wherein one end of the capacitor receives an emission control signal, and the other end of the capacitor is electrically coupled to a gate terminal of the driving transistor;

a reset transistor electrically coupled between an initial voltage terminal and the gate terminal of the driving transistor;

a writing transistor electrically coupled between a data line and the gate terminal of the driving transistor;

a first transistor, wherein a first terminal of the first transistor is electrically coupled to a first terminal of the driving transistor or a second terminal of the driving transistor, wherein a gate terminal of the first transistor receives the emission control signal; and a second transistor electrically coupled between the data line and a second terminal of the first transistor;

wherein during an emission period of the pixel circuit, the driving transistor is turned on according to the emission control signal, thereby generating a driving current flowed from the system high voltage terminal to the system low voltage terminal only through the light emitting element and the driving transistor in sequence.

12. The pixel circuit of claim 11, wherein during the emission period of the pixel circuit, the emission control signal switches between a low logic level and a high logic level according to a duty cycle, so that the driving transistor switches between an on-state and an off-state according to the emission control signal, thereby switching the light emitting element between the on-state and the off-state accordingly.

13. A pixel circuit, comprising:

a light emitting element electrically coupled to a system low voltage terminal;

a driving transistor electrically coupled between the light emitting element and a system high voltage terminal;

a capacitor, wherein one end of the capacitor receives an emission control signal, and the other end of the capacitor is electrically coupled to a gate terminal of the driving transistor;

a reset transistor electrically coupled between an initial voltage terminal and the gate terminal of the driving transistor;

a writing transistor electrically coupled between a data line and the gate terminal of the driving transistor;

a first transistor, wherein a first terminal of the first transistor is electrically coupled to a first terminal of the driving transistor or a second terminal of the driving transistor, wherein a gate terminal of the first transistor receives the emission control signal; and a second transistor electrically coupled between the data line and a second terminal of the first transistor;

wherein during an emission period of the pixel circuit, the driving transistor is turned on according to the emission control signal, thereby generating a driving current flowed from the system high voltage terminal to the system low voltage terminal only through the driving transistor and the light emitting element in sequence.

14. The pixel circuit of claim 13, wherein during the emission period of the pixel circuit, the emission control signal switches between a low logic level and a high logic level according to a duty cycle, so that the driving transistor switches between an on-state and an off-state according to the emission control signal, thereby switching the light emitting element between the on-state and the off-state accordingly.

* * * * *